J. Lewis,
Corn Planter.
No. 109,432. Patented Nov. 22, 1870.
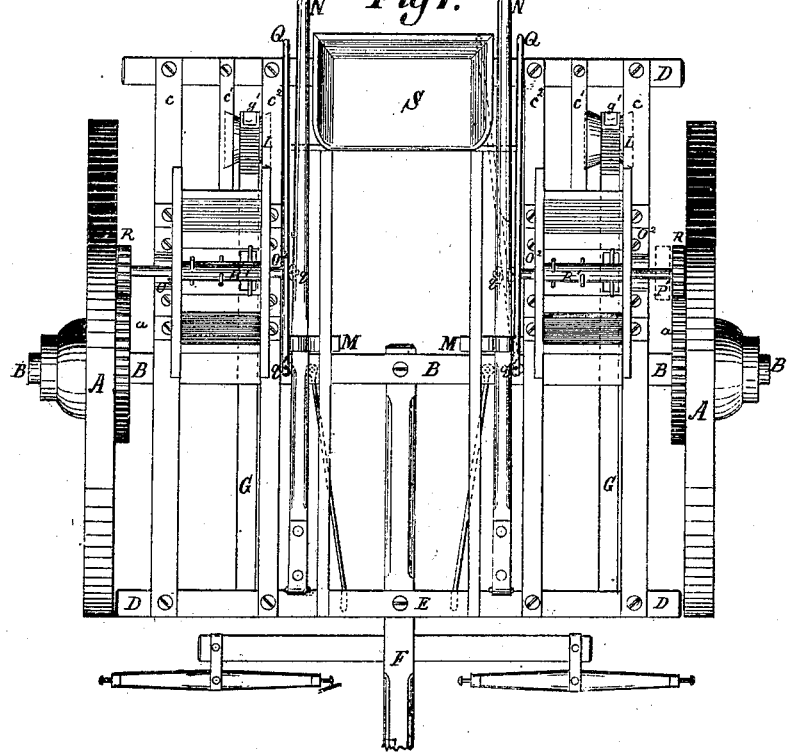
Witnesses:
J. P. Theodore Lang
L. J. Noyes
Inventor:
Jonathan Lewis J. Lewis,  
Corn Planter.  
No. 109,432.  Patented Nov. 22, 1870.

Witnesses:  
J. J. Theodore Lang.  
S. J. Noyes.

Inventor:  
Jonathan Lewis

United States Patent Office.

JONATHAN LEWIS, OF WASHINGTON COUNTY, DISTRICT OF COLUMBIA.

Letters Patent No. 109,432, dated November 22, 1870.

---

IMPROVEMENT IN CULTIVATORS AND SEEDERS COMBINED.

---

The Schedule referred to in these Letters Patent and making part of the same.

---

I, JONATHAN LEWIS, of the County of Washington, in the District of Columbia, have invented certain Improvements in Cultivators, of which the following is a specification.

My invention consists in an additional improvement on a cultivator patented on July 12th, 1870, and my cultivator may thereby, at pleasure, be transformed into a planter without losing its advantages specified in the aforesaid patent.

The improved construction of the seed-distributing apparatus, by which its operation is facilitated, forms the second part of my invention.

In the accompanying drawing—

Figure 1 is a plan view of my cultivator.

Figure 3 is a detached view of the feeding-cylinder.

Figure 2:
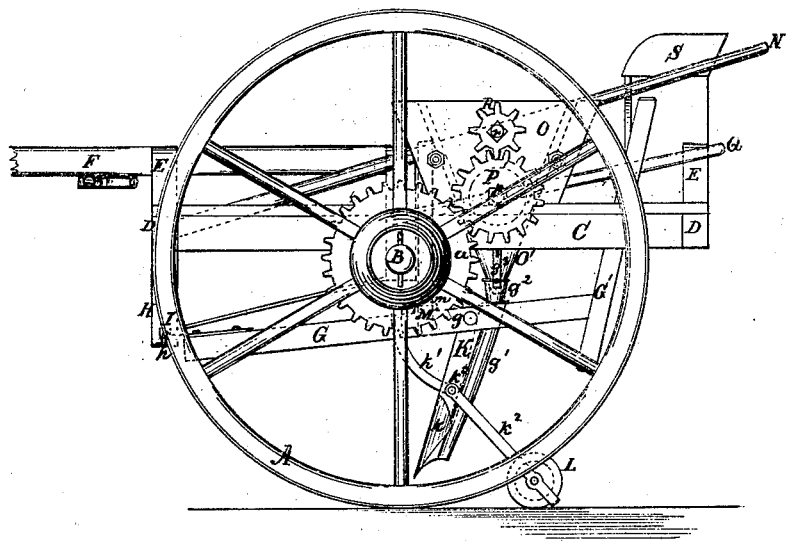
Figure 2 is an elevation of the same.
Figure 4:
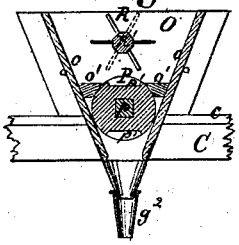
Figure 4 is a vertical section of the distributing-apparatus.

A A represent the two wheels.

B B, the axles.

C C are longitudinal bars of the frame.

D represents the cross-pieces of the frame.

E E represent iron bars by which the cross-pieces D are held together.

F represents the tongue fastened to the front bar E and the axle-tree B.

G represents the plow-beams.

H represents an iron bar fastened to the frame.

I represents an iron rod fastened to H, to which the forward ends of the plow-beams are hitched.

$h$ represents a number of steady-pins fastened to the bar H, which keep the ends of the plow-beams in place.

K represents the plow-legs, to which the plow-shares $k$ are attached.

They may be swung on a pin, $g$, and are kept steady by a segmental rod, $k^1$, and they drag with them a pressure-roller, L, in a frame, $k^2$.

The standard or steady-beam G' is fastened to the rear end of the plow-beam G.

The frame $k^2$ is pivoted to the plow-leg K by the same bolt, $k^3$, which serves to fasten the segmental rod $k^1$ to it.

N represents hand-levers, by which the operator may lift or lower the plow-beams, which are connected to them by rods M and staple $m$.

The plow-leg K is hinged to the plow-beam G with a bolt, $g$, and to its back is fastened the seed-tube $g^1$ into which enters the end of a suspended funnel, $g^2$, attached to the bar C by a couple of straps, $g^3$.

O represents the hopper or seed-box with two inclined sides, $o$ $o$, and the bottoms, $o'$ $o'$, between which the dropping-cylinder P, with its seed-notches $p^1$ $p^1$, is fitted so as to revolve freely between the bottom boards $o'$ $o'$ without allowing the seeds to wedge between them.

This dropping-cylinder is revolved by a gear, $a$, fastened to the hub of the wheel A, which drives another gear-wheel, P', fastened to a square shaft, $p$.

The shaft $p$ has round journals, $p^2$, of greater length than the bearings and its square part is fitted loosely into the dropping-cylinder P.

The ends $p^3$ opposite the wheels P' are reduced in diameter and passed through a lever, Q, on the other side of which is a nut, $q$, screwed on and kept from turning by a pin passed through nut and shaft.

The lever Q may have its fulcrum at $q$, or any other suitable place, and it terminates near the seat of the driver within easy reach.

The seed-box is fastened to the slats $c$ $c^1$ $c^2$, and they are attached to the frame, so that, by unfastening the slats $c$ $c^1$ $c^2$, the seed-box may be removed from the frame with the stirrer R' and its wheel R, the dropping-cylinder remaining on the frame, to which its journals are fastened.

The dropping-cylinder P is one-sided, i. e., the notch $p^1$ drops the seed only into one of the two funnels O', which are fastened beneath each seed-box, while the other is not supplied.

This is for the purpose of planting two rows, and, by making different selections of two of these funnels, (one of each couple,) the width of the rows may be changed to three different distances.

The two plow-beams G must be moved to the receiving-funnels.

The cylinders P are so fitted that they may be easily reversed to supply either the right or the left funnel O¹.

For this purpose the covers O² of the bearings and the journal-boxes are removed, and the nuts $q'$ taken off and the shaft $p$ taken out.

For different purposes in seeding, there may be a whole set of dropping-cylinders with more or less notches, and notches of different sizes, but all on one side of each cylinder, because only one of each pair of funnels O¹ is to be supplied at the time.

If, at any time, the supply of seed should have to be stopped, the operator, by moving the lever Q toward the seat S, does pull the shaft $p$ and the wheel P in the position indicated by dotted lines in fig. 3 and fig. 1.

The connection of the gear-wheels $a$ and P is thus discontinued, and the seed is not distributed any more.

To start the seeding-apparatus, the described operation is to be reversed, and, if the teeth of the wheels $a$ and P' should not readily gear into each other, the wheel P' is made to bear against the wheel $a$ while revolving until the teeth of the one wheel can slip into the spaces of another. As the wheels do not revolve fast, and as the power is very small and the gearing very loose, there is no danger of breakage.

What I claim as my invention, and desire to secure by Letters Patent, is—

The arrangement of the reversible dropping-cylinder P, the steady-pins $h$, as fastened to the bar H of the plow-beam, and the adjusting-rod K', when operating as herein described and for the purposes set forth.

JONATHAN LEWIS.

Witnesses:
HENRY N. MYGATT,
H. McCORMICK.